United States Patent [19]

Kleinecke et al.

[11] Patent Number: 4,688,144
[45] Date of Patent: Aug. 18, 1987

[54] SHUTTER ASSEMBLY FOR A MOTOR CONTROLLER

[75] Inventors: John D. Kleinecke; Samir F. Farag; Thomas R. Little, all of Wichita Falls, Tex.

[73] Assignee: Siemens-Allis, Inc., Atlanta, Ga.

[21] Appl. No.: 821,703

[22] Filed: Jan. 23, 1986

[51] Int. Cl.4 .............................................. H02B 1/14
[52] U.S. Cl. .............................. 361/345; 200/50 AA
[58] Field of Search ................... 200/326, 50 R, 50 A, 200/50 AA; 361/335, 337, 339, 343, 345

[56] References Cited

U.S. PATENT DOCUMENTS

| | | | |
|---|---|---|---|
| 4,146,915 | 3/1979 | Yosida | 361/345 |
| 4,183,073 | 1/1980 | Clausing | 361/345 |
| 4,285,026 | 8/1981 | Clausing | 361/345 |
| 4,417,108 | 11/1983 | Vaill et al. | 200/50 AA |
| 4,468,531 | 8/1984 | Postlewait | 361/345 |
| 4,486,815 | 12/1984 | Takahashi | 361/345 |

Primary Examiner—G. P. Tolin
Attorney, Agent, or Firm—Volker R. Ulbrich; John L. James

[57] ABSTRACT

A shutter mechanism is provided for a motor control center of the type having a backwall with a stab opening for receiving a stab connector for making electrical contact with bus bars which are behind the panel. The shutter consists of two pieces, a stationary member which has a central opening and a vertical slit opening into the central opening and a movable member which has a guide thereon and is positioned between the motor control center and the stationary member with the guide extending through the slit and vertically movable therein. The stationary member is fastened to the motor control center with the central opening overlaying the stab opening. The movable member moves from a closed position to an open position and then from the open position to the closed position under the force of gravity alone without the use of springs.

15 Claims, 6 Drawing Figures

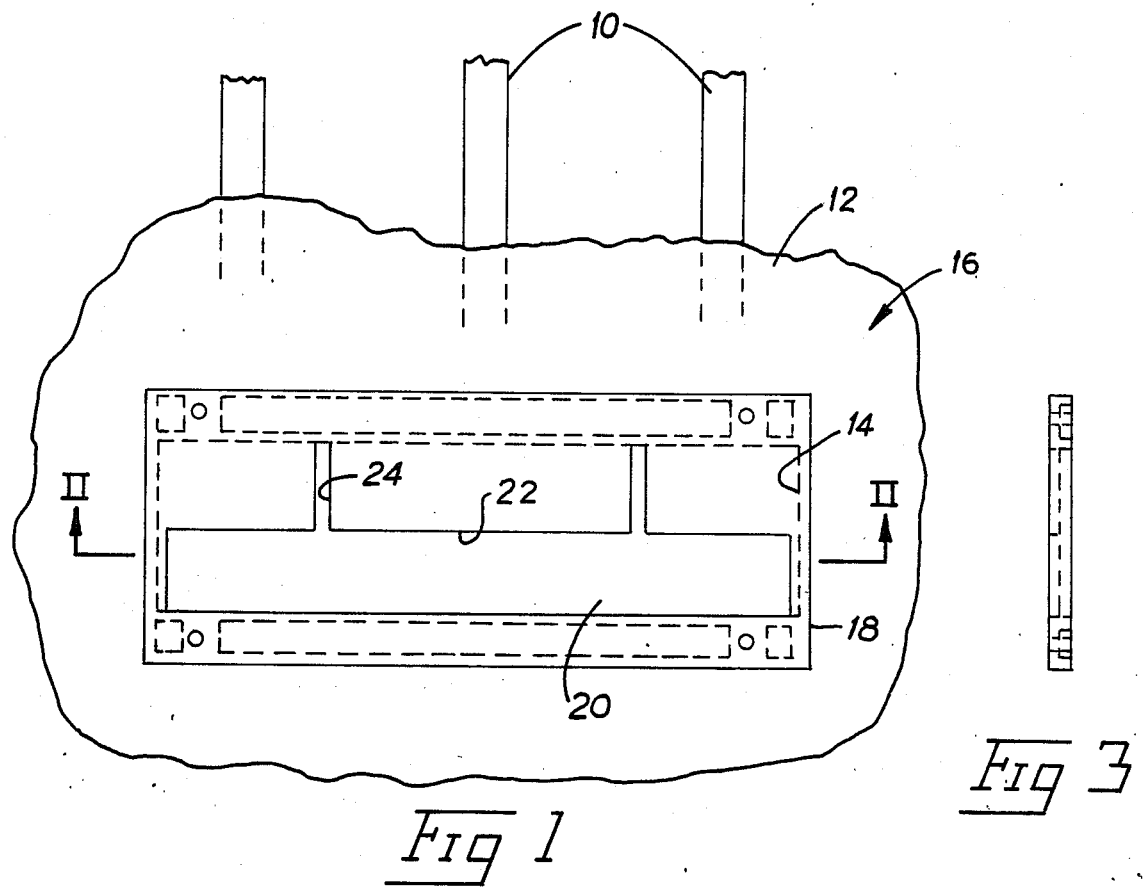
Fig 1
Fig 3
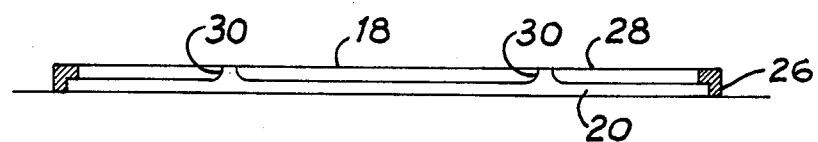
Fig 2

SHUTTER ASSEMBLY FOR A MOTOR CONTROLLER

CROSS-REFERENCE TO RELATED APPLICATIONS

The subject matter described in this application is related to the material disclosed in co-filed patent application Ser. No. 821,617 "Bus Bar Stab and Insulator Assembly For A Motor Controller"—Samir F. Farag, John D. Kleinecke and Thomas R. Little.

BACKGROUND OF THE INVENTION

The present invention relates to motor control centers and more particularly to a shutter mechanism for the motor control center.

Motor control centers, as well as other electrical equipment are equipped with draw-out type protective devices such as fusible disconnect switches or circuit breakers which are racked-in for establishing electrical contact with the bus bar assembly of the motor controller and are racked-out for breaking the electrical connection with the bus bar assembly. When the protective device is racked-out, it is desirable to close off access to the bus bar assembly to prevent inadvertent contact with the energized bus bars. Where there are several protective devices vertically arranged, the bus bars can remain energized when any one of the circuit breaker devices is removed. It is therefore desirable to close the opening to prevent inadvertent or unintentional contact with the energized bus bars.

Various shutter arrangements for preventing access to the bus bars when the protective device is racked out are illustrated in U.S. Pat. Nos. 4,183,073, 4,285,026 and 4,417,108. While the main function of a shutter mechanism is to close off the opening, it can be appreciated that it would be highly desirable to have a shutter assembly which is relatively simple and having few parts. The shutter assemblies illustrated in the above-mentioned patents have many parts and are quite elaborate devices. Generally, in a manufactured product, the higher the number of parts, the higher the manufacturing cost. Therefore, it will be appreciated that it would be highly desirable to provide a shutter mechanism which uses a small number of parts and is easy to manufacture and assemble.

A shutter mechanism which has a limited number of parts is illustrated in U.S. Pat. No. 4,146,915. While the number of parts has been reduced, there are still several parts, each of which must be manufactured and fitted together. Similarly, U.S. Pat. No. 4,486,815 illustrates a shutter device for the control unit of a control center which has relatively few parts. This shutter device does, however, have a tensioning spring which is a manufactured part which adds to the manufacturing cost. Accordingly, it would be appreciated that it would be highly desirable to provide a shutter mechanism for a motor control center which has few parts, is free of springs, is easy to assemble and economical to manufacture.

Accordingly, it is an object of the invention to provide a simple shutter assembly for a motor control assembly.

Another object of the invention is to provide a simple shutter assembly which operates without the use of springs.

Another object of the invention is to provide a shutter assembly which has few parts and is easy to manufacture.

SUMMARY OF THE INVENTION

Briefly stated, in accordance with one aspect of the invention, the foregoing objects are achieved by providing a shutter assembly for a motor control center. The shutter assembly comprises a generally flat stationary member and a movable member. The generally flat stationary member has a central opening with a vertical slit opening into the central opening. The movable member has a guide thereon and is positioned between the motor control center and the stationary member with the guide extending through the slit and vertically movable therein. Means are provided for fastening the stationary member to the motor control center with the central opening overlaying the stab opening.

The shutter assembly has but two parts: the stationary member and the movable member. The shutter assembly is easy to assemble and operate and it operates by gravity without the use of springs.

BRIEF DESCRIPTION OF THE DRAWINGS

While the specification concludes with claims particularly pointing out and distinctly claiming the subject matter which is regarded as the invention, it is believed that the invention would be better understood from the following description of the preferred embodiment taken in conjunction with the accompanying drawings in which:

FIG. 1 is a front view of the stationary member of a shutter assembly in position in a motor control center;

FIG. 2 is a sectional view taken along line II—II of FIG. 1;

FIG. 3 is an end view of the member illustrated in FIG. 1;

DESCRIPTION OF THE PREFERRED EMBODIMENT

Referring to FIG. 1, a motor control center has vertically extending bus bars 10 which run behind a back panel 12 of the motor control center. The back panel 12 of the motor control center will have various openings 14 for receiving stab connectors for making connection between the draw-out circuit breaker apparatus of the control center and the bus bars. A shutter assembly 16 is provided for the stab opening for preventing inadvertent access to the bus bars when the circuit breaker apparatus is drawn out.

Figure 6:
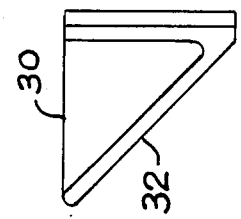
FIG. 6 is an end view of the movable member illustrated in FIG. 4.
Figure 5:
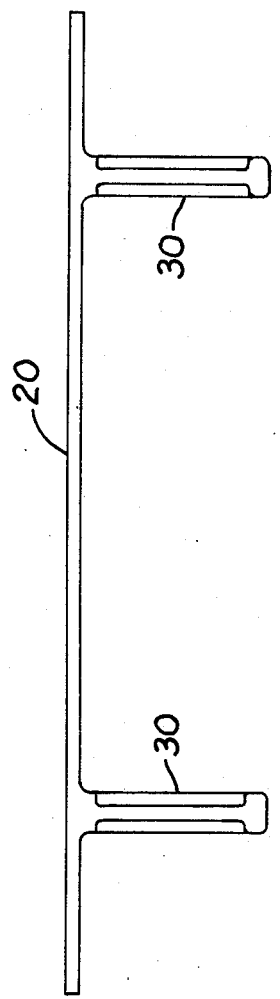
FIG. 5 is a top view of the movable member illustrated in FIG. 4.
Figure 4:
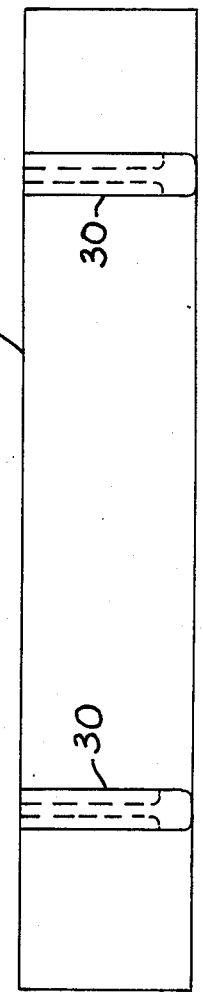
FIG. 4 is a plan view of the movable member of the shutter assembly.

Referring to FIGS. 1 through 6, the shutter assembly 16 includes two pieces, a stationary member 18 and a movable member 20. The stationary member 18 is a generally flat member which has a central opening 22 and a vertical slit 24 opening into the central opening 22. Preferably, the stab opening 14 is larger than the central opening 22 of the stationary member 18. The stab opening 14 preferably has a vertical dimension which is greater than the combined vertical dimensions of the central opening 22 and slit 24. By this construction, the stationary member 18 is larger than the stab opening 14 and covers the stab opening 14 but allows access to the bus bars 10 through the central opening 22 which is smaller than the stab opening 14.

The stationary member 18 may have a peripheral portion 26 which is attachable over the stab opening 14 and a raised generally flat portion 28 with the central opening 22 overlaying the stab opening 14. This would give the stationary member a pan-like or a box-like configuration. The peripheral portion provides more or less a seal between the shutter assembly 16 and the backwall 12 of the motor control center which will prevent the entrance of dirt or other foreign material through the stab opening 14. As an alternative, a filler material may be positioned between the backwall 12 and the stationary member 18 to fill the space between the backwall 12 and the shutter assembly 16. It is preferred a space exist between the backwall and the stationary member so that the movable member can fit therebetween.

The movable member 20 has a guide 30 thereon and positioned between the motor control center and the stationary member 18 with the guide extending through the slit 24 and vertically movable therein. The guide has an edge portion 32 angularly extending from the movable member 20 whereby a bus stab finger contacting the edge portion imparts a vertical motion to the movable member. The bus stab finger is fully described in the above-mentioned co-filed application Ser. No. 821,617 which is incorporated herein by reference.

The shutter assembly is preferably constructed of an insulative material such as Noryl, for example, but can be made of metal. Assembly of the shutter mechanism is accomplished by inserting the movable member through the central opening so that the guides on the movable member extend through the slits and are vertically movable therein. This unit can then be attached to the panel of the motor control center from the front so that the central opening overlays the stab opening. By this construction, the movable member is movable between a closed position at which the movable member blocks communication between the central opening and the stab opening and an open position at which the movable member is vertically displaced establishing communication between the central opening and the stab opening. The movable member moves from the closed position to the open position in response to a stab assembly stab finger engaging the guide surface urging the guide vertically upward thereby moving the movable member vertically upward. When the stab assembly is disconnected from the bus bars and the stab housing fingers are removed, the movable member moves from the open position to the closed position under the force of gravity alone without the need for springs.

It will now be understood that there has been disclosed an improved shutter mechanism for a motor control center which consists of two pieces: a movable member and a stationary member. The movable member moves between the open and closed positions under the force of gravity alone without the need for springs. The shutter assembly can be constructed of plastic material which can be easily molded thereby reducing manufacturing costs. The shutter assembly is simple and can be installed from the front of the motor control center without the need to enter from the rear where the bus bars are located. Thus, the shutter assembly can be installed without the need for deenergizing the whole load center. This is an important feature, especially when time is of the essence. Since the shutter assembly attaches from the front, it can be used only where it is needed.

As will be evident from the foregoing description, certain aspects of the invention are not limited to the particular details of the examples illustrated, and it is therefore contemplated that other modifications or applications will occur to those skilled in the art. It is accordingly intended that the claims shall cover all such modifications and applications as do not depart from the true spirit and script of the invention.

What is claimed as new and desired to be secured by Letters Patent of the United States is:

1. A shutter assembly in a motor control center having a stab opening, comprising:
   a generally flat stationary member defining a central opening and a vertical slit which opens into the central opening;
   means fastening said stationary member to the motor control center with the central opening overlaying the stab opening and said stationary member being spaced from the motor control center; and
   a movable member having a guide thereon and being positioned between the motor control center and the stationary member with the guide extending through the slit and vertically movable therein.

2. A shutter assembly according to claim 1, wherein the guide has an edge portion angularly extending from the movable member whereby a bus stab finger contacting the edge portion imparts a vertical motion to the moveable member.

3. A shutter assembly according to claim 1, wherein the stab opening is larger than the central opening of the stationary member.

4. A shutter assembly according to claim 1, wherein the stab opening has a vertical dimension greater than the combined vertical dimension of the central opening and slit.

5. A shutter assembly according to claim 1, including a filler positioned between the motor control center and stationary member.

6. A shutter assembly according to claim 1, wherein the movable member is movable between a closed position at which movable member blocks communication between the central opening and the stab opening and an open position at which the movable member is vertically displaced establishing communication between the central opening and stab opening.

7. A shutter assembly according to claim 6, wherein the guide has an edge portion angularly extending from the movable member and wherein themovable member moves from the closed position to the open position in response to a bus stab finger acting on the edge portion of the guide.

8. A shutter assembly according to claim 6, wherein the movable member moves from the open position to the closed position under the force of gravity.

9. A shutter assembly in a motor control center having a stab opening comprising a two-piece assembly having a first stationary membr and a second movable member, said stationary member having a peripheral portion attached over the stab opening and a raised generally flat portion defining a central opening overlaying the stab opening and defining vertical slit opening into the central opening, said movable member having a guide thereon and being positioned between the motor control center raised flat portion and the stationary member with the guide extending through the slit and vertically movable therein.

10. A shutter assembly according to claim 9, wherein the guide has as edge portion angularly extendingfrom the movable member whereby a bus stab finger contacting the edge portion imparts a vertical motion to the movable member.

11. A shutter assembly according to claim 9, wherein the stab opening is larger than the central opening of the stationary member.

12. A shutter assembly according to claim 9, wherein the stab opening has a vertical dimension greater than the combined vertical dimension of the central opening and slit.

13. A shutter assembly according to claim 9, wherein the movable member is movable between a closed position at which movable member blocks communication between the central opening and the stab opening and an open position at which the movable member is vertically displaced establishing communication between the central opening and stab opening.

14. A shutter assembly according to claim 13, wherein the guide has an edge portion angularly extending from the movable member and wherein the movable member moves from the closed position to the open position in response to a bus stab finger acting on the edge portion of the guide.

15. A shutter assembly according to claim 6, wherein the movable member moves from the open position to the closed position under the force of gravity.

* * * * *